(12) United States Patent
Kasuya et al.

(10) Patent No.: US 11,441,511 B2
(45) Date of Patent: Sep. 13, 2022

(54) ENGINE CONTROLLER

(71) Applicant: SUBARU CORPORATION, Tokyo (JP)

(72) Inventors: Hiroki Kasuya, Tokyo (JP); Shotaro Harimoto, Tokyo (JP); Masaaki Watanabe, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/500,282

(22) Filed: Oct. 13, 2021

(65) Prior Publication Data

US 2022/0112857 A1  Apr. 14, 2022

(30) Foreign Application Priority Data

Oct. 14, 2020 (JP) ............................. JP2020-173025

(51) Int. Cl.
*F02D 41/00* (2006.01)
*F02D 41/40* (2006.01)
(Continued)

(52) U.S. Cl.
CPC .......... *F02D 41/401* (2013.01); *F01N 3/101* (2013.01); *F01N 3/20* (2013.01); *F02D 41/0047* (2013.01); *F02D 41/027* (2013.01); *F02D 41/028* (2013.01); *F02D 41/0275* (2013.01); *F02D 2041/389* (2013.01); *F02D 2200/021* (2013.01);
(Continued)

(58) Field of Classification Search
CPC ............. F02D 41/0055; F02D 41/0275; F02D 41/028; F02D 41/0285; F02D 2200/0818
See application file for complete search history.

(56) References Cited

U.S. PATENT DOCUMENTS

2014/0090362 A1*  4/2014  Eckhoff ................. F02M 26/06
                                                                60/274
2015/0143799 A1   5/2015  Lee
(Continued)

FOREIGN PATENT DOCUMENTS

| JP | 2003-120268 A | 4/2003 |
| JP | 2004-176632 A | 6/2004 |
| JP | 2015-102089 A | 6/2015 |

*Primary Examiner* — Erick R Solis
(74) *Attorney, Agent, or Firm* — McDermott Will & Emery LLP

(57) ABSTRACT

An engine controller controlling an engine including an occlusion reduction catalyst in an exhaust device includes a fuel injection controller that controls a fuel injection amount of an injector, an EGR controller that controls an EGR device, a sulfur purge determiner that determines whether sulfur purging of the catalyst is to be performed, and a sulfur purge controller that executes sulfur purge control if the sulfur purging is performed. The sulfur purge control involves performing a fuel injection to achieve a rich air-fuel ratio at an inlet of the catalyst and prohibiting the exhaust-gas introduction. The sulfur purge controller executes sulfur-purge standby control when a sulfur-purge standby condition is satisfied, and resumes the sulfur purge control when the condition becomes non-satisfied after starting the sulfur-purge standby control. The sulfur-purge standby control involves performing the fuel injection to nearly achieve a stoichiometric air-fuel ratio and prohibiting the exhaust-gas introduction.

9 Claims, 2 Drawing Sheets

(51) Int. Cl.
  *F01N 3/20* (2006.01)
  *F02D 41/02* (2006.01)
  *F01N 3/10* (2006.01)
  *F02D 41/38* (2006.01)
(52) U.S. Cl.
  CPC .. *F02D 2200/04* (2013.01); *F02D 2200/0802* (2013.01); *F02D 2200/0818* (2013.01)

(56) References Cited

U.S. PATENT DOCUMENTS

2018/0017002 A1\* 1/2018 Kanno .................. F01N 3/0814
2018/0017003 A1\* 1/2018 Yamaguchi ........... F01N 3/0814

\* cited by examiner

ENGINE CONTROLLER

CROSS-REFERENCE TO RELATED APPLICATIONS

The present application claims priority from Japanese Patent Application No. 2020-173025 filed on Oct. 14, 2020, the entire contents of which are hereby incorporated by reference.

BACKGROUND

The disclosure relates to engine controllers that control engines having occlusion reduction catalysts in exhaust devices.

For example, an exhaust device of an engine installed in a vehicle, such as an automobile, is provided with an exhaust-gas post-treatment device that reduces toxic substances in exhaust gas.

For example, a known gasoline engine is provided with a three-way catalyst that can reduce $NO_X$, CO, and HC in the exhaust gas when the engine is operating with an air-fuel ratio close to a stoichiometric air-fuel ratio (i.e., theoretical air-fuel ratio).

It is also known that the exhaust device is provided with an occlusion reduction catalyst (i.e., $NO_X$ trap catalyst) that occludes $NO_X$ for suppressing $NO_X$ emission even in a case where, for example, the engine operates in a state where the air-fuel ratio is leaner than the active range of the three-way catalyst.

An occlusion reduction catalyst adsorbs $NO_X$ in the exhaust gas together with a sulfur oxide ($SO_X$) deriving from sulfur contained in fuel. However, if sulfur poisoning where the adsorption amount of $SO_X$ increases worsens, the $NO_X$ occlusion performance deteriorates.

Therefore, in a known engine having an occlusion reduction catalyst, unburnt fuel is supplied as a reducing agent in a state where the temperature in the catalyst layer has increased, thereby reducing $SO_X$ and performing a purging process.

For example, Japanese Unexamined Patent Application Publication (JP-A) No. 2004-176632 discloses a related art technology with respect to a regeneration process of an exhaust-gas treatment device. The technology involves exclusively resetting an air-fuel-ratio learning value learned when either of the temperature of an air-fuel-ratio detector and an exhaust temperature is below a predetermined temperature to an initial value before starting to control a reducing-agent supplier to remove $SO_X$ from a $SO_X$ retaining agent, and then controlling the air-fuel ratio of an internal combustion engine while fully utilizing an air-fuel-ratio learning value learned when the air-fuel-ratio detector is not poisoned by an unburnt fuel component.

JP-A No. 2015-102089 relates to lean $NO_X$ trap (LNT) involving occluding $NO_X$ contained in exhaust gas in a lean air-fuel-ratio atmosphere and desorbing $NO_X$ occluded in a rich atmosphere. When a desulfurization stoppage condition is satisfied while a desulfurizing mode of LNT is being executed, the desulfurization of LNT is stopped and the number of desulfurization stoppages is accumulated. When the desulfurization is completed, the number of desulfurization stoppages is reset.

JP-A No. 2003-120268 describes a countermeasure against a reduced frequency at which a condition for removing (S-purging) $SO_X$ occluded by an occlusion reduction catalyst is satisfied. The countermeasure involves retaining a frequency-temperature characteristic preliminarily defining the relationship between a frequency of reaching a state where a sulfur component is to be released and a set temperature value at which a regenerating unit is actuated as a plurality of control maps, and switching between the plurality of control maps based on the history of the frequency of reaching the state where the sulfur component is to be released within a predetermined period.

SUMMARY

An aspect of the disclosure provides an engine controller configured to control an engine including an occlusion reduction catalyst in an exhaust device. The engine controller includes a fuel injection controller, an exhaust-gas-recirculation controller, a sulfur purge determiner, and a sulfur purge controller. The fuel injection controller is configured to control a fuel injection amount of an injector configured to inject fuel into a combustion chamber of the engine. The exhaust-gas-recirculation controller is configured to control an exhaust-gas-recirculation device configured to introduce exhaust gas from the exhaust device of the engine to an intake device. The sulfur purge determiner is configured to determine whether sulfur purging of the occlusion reduction catalyst is to be performed. The sulfur purge controller is configured to execute sulfur purge control in a case where the sulfur purge determiner determines that the sulfur purging is to be performed. The sulfur purge control includes causing the fuel injection controller to perform a fuel injection such that an air-fuel ratio at an inlet of the occlusion reduction catalyst becomes rich and causing the exhaust-gas-recirculation controller to prohibit the introduction of the exhaust gas. The sulfur purge controller is configured to execute sulfur-purge standby control in a case where a predetermined sulfur-purge standby condition is satisfied, and resume the sulfur purge control in a case where the sulfur-purge standby condition becomes non-satisfied after starting the sulfur-purge standby control. The sulfur-purge standby control includes causing the fuel injection controller to perform the fuel injection such that the air-fuel ratio becomes close to a stoichiometric air-fuel ratio and causing the exhaust-gas-recirculation controller to prohibit the introduction of the exhaust gas.

An aspect of the disclosure provides an engine controller configured to control an engine including an occlusion reduction catalyst in an exhaust device. The engine controller includes circuitry. The circuitry is configured to control a fuel injection amount of an injector configured to inject fuel into a combustion chamber of the engine. The circuitry is configured to control an exhaust-gas-recirculation device configured to introduce exhaust gas from the exhaust device of the engine to an intake device. The circuitry is configured to determine whether sulfur purging of the occlusion reduction catalyst is to be performed. The circuitry is configured to execute sulfur purge control upon determining that the sulfur purging is to be performed. The sulfur purge control includes performing a fuel injection such that an air-fuel ratio at an inlet of the occlusion reduction catalyst becomes rich and prohibiting the introduction of the exhaust gas. The circuitry is configured to execute sulfur-purge standby control in a case where a predetermined sulfur-purge standby condition is satisfied, and resume the sulfur purge control in a case where the sulfur-purge standby condition becomes non-satisfied after starting the sulfur-purge standby control. The sulfur-purge standby control includes performing the fuel injection such that the air-fuel ratio becomes close to a stoichiometric air-fuel ratio and prohibiting the introduction of the exhaust gas.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

When sulfur purging of the occlusion reduction catalyst is to be performed, sulfur purge control may be frequently interrupted based on a temporary phenomenon, such as an increase in engine output caused by an operation performed on the accelerator pedal by the driver.

In this case, even if the sulfur purge control is to be resumed after the phenomenon that has caused the interruption in the sulfur purge control is resolved, it is desirable that the catalyst layer be increased in temperature again to a predetermined temperature range, resulting in an extended period of time for recovering the exhaust-gas purging performance.

Furthermore, when sulfur purging is to be performed, exhaust gas recirculation (EGR) for introducing exhaust gas to an intake device is prohibited for increasing the temperature of the catalyst layer. However, when the state of EGR changes frequently due to the interruption in the sulfur purge control, the output torque significantly fluctuates, possibly causing, for example, a vehicle shock.

Moreover, since sulfur purge control involves poor fuel efficiency, the fuel efficiency of the vehicle may be adversely affected if the time spent to the end of the sulfur purge control is extended.

It is desirable to provide an engine controller that enables an early recovery from sulfur poisoning of an occlusion reduction catalyst.

An engine controller according to an embodiment of the disclosure will be described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

The engine controller according to this embodiment collectively controls, for example, a horizontally-opposed four-cylinder direct-injection gasoline turbocharged engine equipped as a driving source of an automobile, such as a car, as well as auxiliary units thereof.

Figure 1:
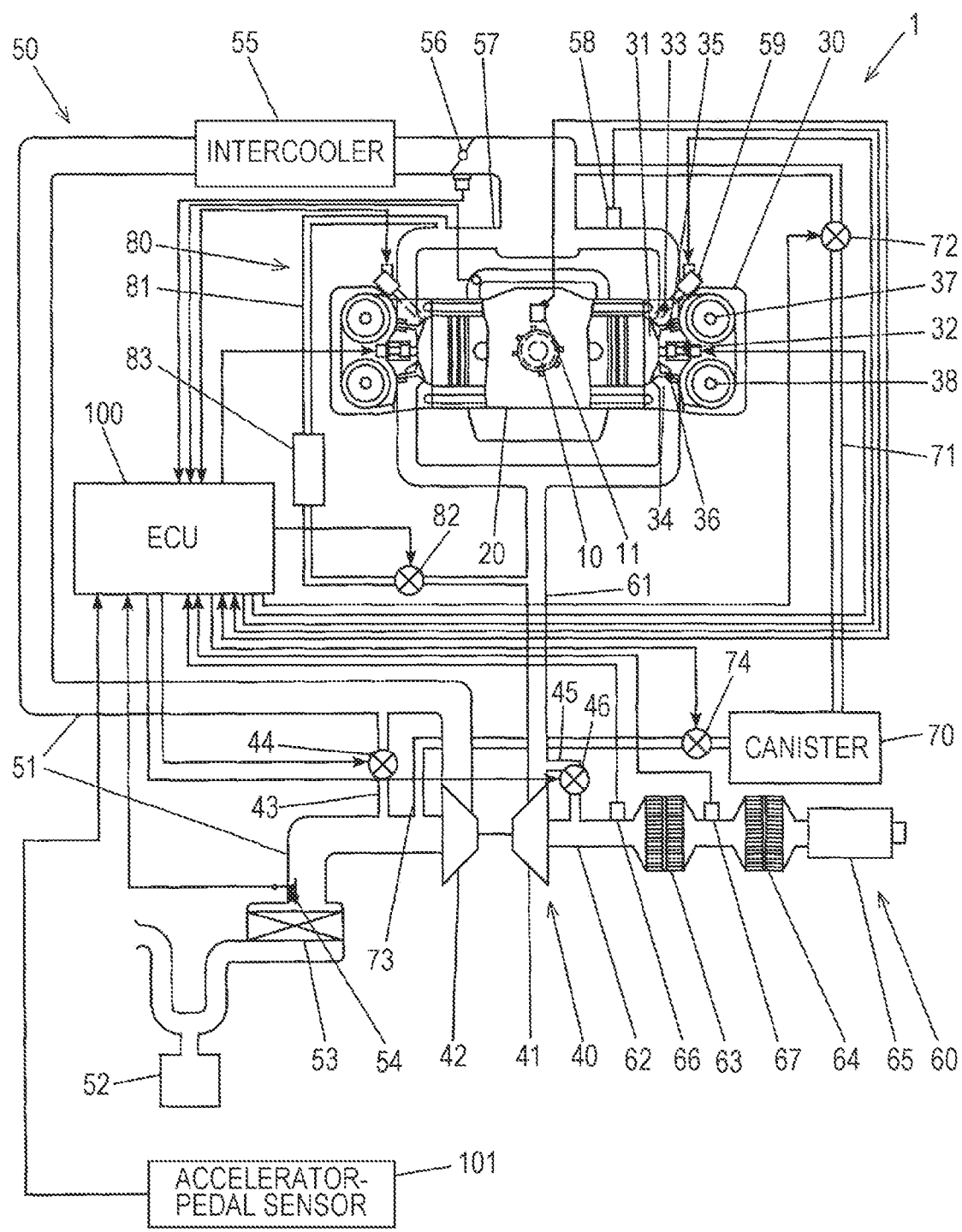
FIG. 1 schematically illustrates the configuration of an engine having an engine controller according to an embodiment of the disclosure.

FIG. 1 schematically illustrates the configuration of an engine having the engine controller according to the embodiment.

An engine 1 has, for example, a crankshaft 10, a cylinder block 20, cylinder heads 30, a turbocharger 40, an intake system 50, an exhaust device 60, a canister 70, an exhaust-gas-recirculation (EGR) device 80, and an engine control unit (ECU) 100.

The crankshaft 10 is a rotary shaft serving as an output shaft of the engine 1.

One end of the crankshaft 10 is coupled to a power transmission mechanism, such as a transmission (not illustrated).

The crankshaft 10 is coupled to pistons by using connecting rods.

A crank angle sensor 11 that detects an angular position of the crankshaft 10 is provided at an end of the crankshaft 10.

An output from the crank angle sensor 11 is transmitted to the ECU 100.

The cylinder block 20 has a two-part structure that sandwiches the crankshaft 10 from left and right directions in a case where the cylinder block 20 is installed vertically in the vehicle body.

A central area of the cylinder block 20 is provided with a crankshaft casing that accommodates the crankshaft 10 and that has a main bearing. The main bearing rotatably supports the crankshaft 10.

The cylinder block 20 has left and right banks respectively disposed at the left and right sides of the crankshaft casing. The left and right banks each contain, for example, a pair of cylinders in which pistons are fitted and reciprocate (in the case of four cylinders).

The cylinder heads 30 are respectively provided at opposite ends (i.e., left and right ends) of the cylinder block 20 relative to the crankshaft 10.

Each cylinder head 30 includes a combustion chamber 31, an ignition plug 32, an intake port 33, an exhaust port 34, an intake valve 35, an exhaust valve 36, an intake camshaft 37, and an exhaust camshaft 38.

The combustion chamber 31 is, for example, a pent-roof-shaped recess in an area facing the piston crown surface of the cylinder head 30.

The ignition plug 32 is provided at the center of the combustion chamber 31 and is configured to ignite an air-fuel mixture by generating a spark in accordance with an ignition signal from the ECU 100.

The intake port 33 is a passage that introduces combustion air (i.e., new air) to the combustion chamber 31.

The exhaust port 34 is a passage that discharges burnt gas (i.e., exhaust gas) from the combustion chamber 31.

The intake valve 35 and the exhaust valve 36 open and close the intake port 33 and the exhaust port 34 at predetermined valve timings.

Each cylinder is provided with, for example, two intake valves 35 and two exhaust valves 36.

The intake valves 35 and the exhaust valves 36 are opened and closed by the intake camshaft 37 and the exhaust camshaft 38 that rotate synchronously at half the rotation speed of the crankshaft 10.

A camshaft sprocket of each of the intake camshaft 37 and the exhaust camshaft 38 is provided with a valve-timing adjusting mechanism (not illustrated) that changes the opening timing and the closing timing of each valve by advancing and retarding the phase of the camshaft.

The turbocharger 40 utilizes the energy of the exhaust gas of the engine 1 to compress and turbocharge combustion air (i.e., new air).

The turbocharger 40 includes, for example, a turbine 41, a compressor 42, an air bypass passage 43, an air bypass valve 44, a waste gate passage 45, and a waste gate valve 46.

The turbine 41 is rotationally driven by the exhaust gas of the engine 1.

The compressor 42 is coaxially attached to the turbine 41 and is rotationally driven by the turbine 41 to compress air.

The air bypass passage 43 extracts a portion of air from the downstream side of the compressor 42 and causes the portion of the air to flow back to the upstream side of the compressor 42.

The air bypass valve 44 is provided in the air bypass passage 43 and is switchable between two states, namely, a closed state in which the air bypass passage 43 is substantially blocked and an open state in which air is allowed to flow through the air bypass passage 43, in accordance with a command from the ECU 100.

The air bypass valve 44 is an electric valve having a valve body that is opened and closed by an electric actuator.

For example, in a case where a throttle valve 56 suddenly closes, the air bypass valve 44 is set to the open state to prevent surging of the turbocharger 40 and to protect the blade, so that the air in the intake pipe downstream of the compressor flows back to the upstream side of the compressor 42, thereby reducing excess pressure.

The waste gate passage 45 is a bypass passage for extracting a portion of exhaust gas from the upstream side of the turbine 41 and causing the portion of the exhaust gas to flow to the downstream side of the turbine 41 for the purpose of, for example, controlling the turbocharging pressure and increasing the catalyst temperature.

The waste gate passage 45 is integrated with a housing of the turbine 41.

The waste gate valve 46 has a valve body that is provided in the waste gate passage 45 and that opens and closes the waste gate passage 45, and is configured to control the flow rate of exhaust gas flowing through the waste gate passage 45.

The waste gate valve 46 is an electric waste gate valve having an electric actuator that opens and closes the valve body in accordance with a command from the ECU 100.

The waste gate valve 46 is switchable between a fully open state and a fully closed state, and can also be set to any degree of opening at an intermediate position between the two states.

The intake system 50 takes in air and introduces the air to the intake port 33.

The intake system 50 includes, for example, an intake duct 51, a chamber 52, an air cleaner 53, an airflow meter 54, an intercooler 55, a throttle valve 56, an intake manifold 57, an intake pressure sensor 58, and an injector 59.

The intake duct 51 is a passage that takes in outside air and introduces the outside air to the intake port 33.

The chamber 52 is a space provided near the inlet of the intake duct 51 and communicates therewith.

The air cleaner 53 is provided downstream of the area where the intake duct 51 communicates with the chamber 52 and is configured to remove, for example, dust from the air by filtering the air.

The airflow meter 54 is provided near the outlet of the air cleaner 53 and is configured to measure the flow rate of air flowing through the intake duct 51.

An output from the airflow meter 54 is transmitted to the ECU 100.

The compressor 42 of the turbocharger 40 is provided downstream of the airflow meter 54.

The intercooler 55 is a heat exchanger that is provided in the intake duct 51 at the downstream side of the compressor 42 and that cools compressed and heated air by performing a heat exchange with, for example, the travel wind.

The throttle valve 56 is a butterfly valve that is provided in the intake duct 51 at the downstream side of the intercooler 55 and that controls an output from the engine 1 by adjusting the flow rate of air.

The throttle valve 56 is opened and closed by a throttle actuator (not illustrated) in accordance with, for example, an operation performed on the accelerator pedal (not illustrated) by the driver.

The throttle valve 56 is provided with a throttle sensor that detects the degree of opening of the throttle valve 56. An output from the throttle sensor is transmitted to the ECU 100.

The intake manifold 57 is a branch pipe that is provided downstream of the throttle valve 56 and that distributes air to the intake ports 33 of the individual cylinders.

The intake pressure sensor 58 is configured to detect the pressure of air (i.e., intake pressure) in the intake manifold 57.

An output from the intake pressure sensor 58 is transmitted to the ECU 100.

The injector 59 is provided at the cylinder-head-30-side end of the intake manifold 57 and is configured to produce an air-fuel mixture by injecting fuel into the combustion chamber 31 in accordance with an injection signal given by the ECU 100.

The exhaust device 60 is configured to discharge exhaust gas discharged from the exhaust port 34 to the outside.

The exhaust device 60 has an exhaust manifold 61, an exhaust pipe 62, a three-way catalyst 63, an occlusion reduction catalyst 64, a silencer 65, and air-fuel ratio sensors 66 and 67.

The exhaust manifold 61 is a collecting pipe that collects exhaust gas discharged from the exhaust port 34 of each cylinder.

The turbine 41 of the turbocharger 40 is disposed downstream of the exhaust manifold 61.

The exhaust pipe 62 is configured to discharge exhaust gas discharged from the turbine 41 to the outside.

The three-way catalyst 63 is provided at an intermediate location of the exhaust pipe 62.

The three-way catalyst 63 purges HC, $NO_X$, and CO of the exhaust gas.

The three-way catalyst 63 is provided adjacent to the outlet of the turbine 41.

The three-way catalyst 63 exhibits a purging function in a predetermined active range in which the air-fuel ratio is close to a theoretical (stoichiometric) air-fuel ratio.

The occlusion reduction catalyst 64 is provided at an intermediate location of the exhaust pipe 62 and at the downstream side (i.e., at the outlet side) of the three-way catalyst 63.

The occlusion reduction catalyst 64 is a lean $NO_X$ trap (LNT) catalyst that temporarily occludes $NO_X$ in the exhaust gas when the engine 1 operates with a lean air-fuel mixture and that reduces $NO_X$ using fuel as a reducing agent when the engine 1 operates with a rich air-fuel mixture.

The inlet and the outlet of the occlusion reduction catalyst 64 are provided with $NO_X$ sensors (not illustrated) that detect the $NO_X$ concentration in the exhaust gas.

The silencer 65 is provided near the outlet of the exhaust pipe 62 and is configured to reduce acoustic energy of the exhaust gas.

The air-fuel ratio sensor 66 is provided between the outlet of the turbine 41 and the inlet of the three-way catalyst 63.

The air-fuel ratio sensor 67 is provided between the outlet of the three-way catalyst 63 and the inlet of the occlusion reduction catalyst 64.

Each of the air-fuel ratio sensors 66 and 67 is a linear output sensor that detects the amount of oxygen in the exhaust gas by generating an output voltage according to the oxygen concentration in the exhaust gas.

An output from each of the air-fuel ratio sensors 66 and 67 is transmitted to the ECU 100.

The canister (i.e., charcoal canister) 70 is a fuel evaporation gas processor that receives fuel evaporation gas generated in a fuel tank (not illustrated) where gasoline to be used as fuel in the engine 1 is retained and that temporarily stores the fuel evaporation gas.

The canister 70 is formed by accommodating activated charcoal capable of temporarily adsorbing the fuel evaporation gas inside a canister casing serving as a resinous housing.

The canister 70 includes a purge line 71 and a purge control valve 72 mainly for a non-turbocharging mode, and also includes a purge line 73 and a purge control valve 74 mainly for a turbocharging mode.

The purge line 71 is a passage that has opposite ends respectively coupled to the canister 70 and the intake manifold 57, and allows the canister 70 and the intake manifold 57 to internally communicate with each other.

During the non-turbocharging mode in which the intake manifold 57 has negative pressure inside, the purge line 71 introduces purge gas composed of the fuel evaporation gas released from the canister 70 into the intake manifold 57.

The purge control valve (PCV) 72 is a duty-control solenoid valve provided at an intermediate location of the purge line 71.

In accordance with a command from the ECU 100, the PCV 72 is switchable between an open state and a closed state and can also be set to a desired degree of opening in the open state.

The purge line 73 is a passage that has opposite ends respectively coupled to the canister 70 and a region of the intake duct 51 located adjacent to the inlet of the compressor 42, and allows the canister 70 and the intake duct 51 to internally communicate with each other.

During the turbocharging mode in which the intake manifold has positive pressure inside and it is difficult to introduce purge gas through the purge line 71, the purge line introduces the purge gas into the intake duct 51 at the upstream side of the compressor 42.

The purge control valve (PCV) 74 is an electromagnetic valve provided at an intermediate location of the purge line 73. The PCV 74 is switchable between an open state and a closed state in accordance with a command from the ECU 100.

The EGR device 80 introduces (i.e., recirculates) exhaust gas extracted from the exhaust device 60 to the intake manifold for the purposes of, for example, reducing a pump loss during a partial load, reducing a cooling loss caused by a suppressed combustion temperature, and suppressing an occurrence of $NO_X$.

The EGR device 80 includes, for example, an EGR line 81, an EGR valve 82, and an EGR cooler 83.

The EGR line 81 is a passage that introduces exhaust gas to the intake manifold 57 from a segment of an exhaust gas passage.

As an alternative to the example illustrated in FIG. 1 in which the EGR line 81 extracts exhaust gas from the exhaust pipe 62, the EGR line 81 may be configured to extract exhaust gas from either of the exhaust manifold 61 and the exhaust port 34.

In accordance with a command from the ECU 100, the EGR valve 82 is switchable between an open state in which EGR gas (i.e., exhaust gas) is allowed to flow through the EGR line 81 and a closed state in which the EGR line 81 is blocked, and can also adjust the degree of opening (i.e. the flow rate of exhaust gas) in the open state.

The EGR cooler 83 is provided at an intermediate location of the EGR line 81 and is configured to cool the exhaust gas by performing a heat exchange with, for example, either of a coolant in the engine 1 and the travel wind.

The ECU 100 collectively controls the engine 1 and the auxiliary units thereof.

The ECU 100 includes, for example, an information processing unit, such as a central processing unit (CPU), storage units, such as a random access memory (RAM) and a read-only memory (ROM), an input-output interface, and a bus that couples these units to one another.

The ECU 100 is also provided with an accelerator-pedal sensor 101 that detects an amount by which the accelerator pedal (not illustrated) is operated by the driver.

The ECU 100 sets a driver requested torque based on an output from the accelerator-pedal sensor 101.

The ECU 100 controls, for example, the degree of opening of the throttle valve 56, the turbocharging pressure, the fuel injection amount, the ignition timing, and the valve timing so that a torque actually generated by the engine 1 approaches the set driver requested torque.

The ECU 100 controls the fuel injection amount and the fuel injection timing of the injector 59, and controls the EGR device 80. In one embodiment, the ECU 100 may serve as a "fuel injection controller" and an "exhaust-gas-recirculation controller".

Moreover, the ECU 100 estimates an amount of adsorption of a sulfur oxide ($SO_X$) to the occlusion reduction catalyst 64 and determines whether to perform sulfur purge control, to be described later, and executes the sulfur purge control. In one embodiment, the ECU 100 may serve as a "sulfur purge determiner" and a "sulfur purge controller".

Furthermore, the ECU 100 executes sulfur-purge standby control when a sulfur-purge standby condition is satisfied.

This will be described in detail below.

Figure 2:
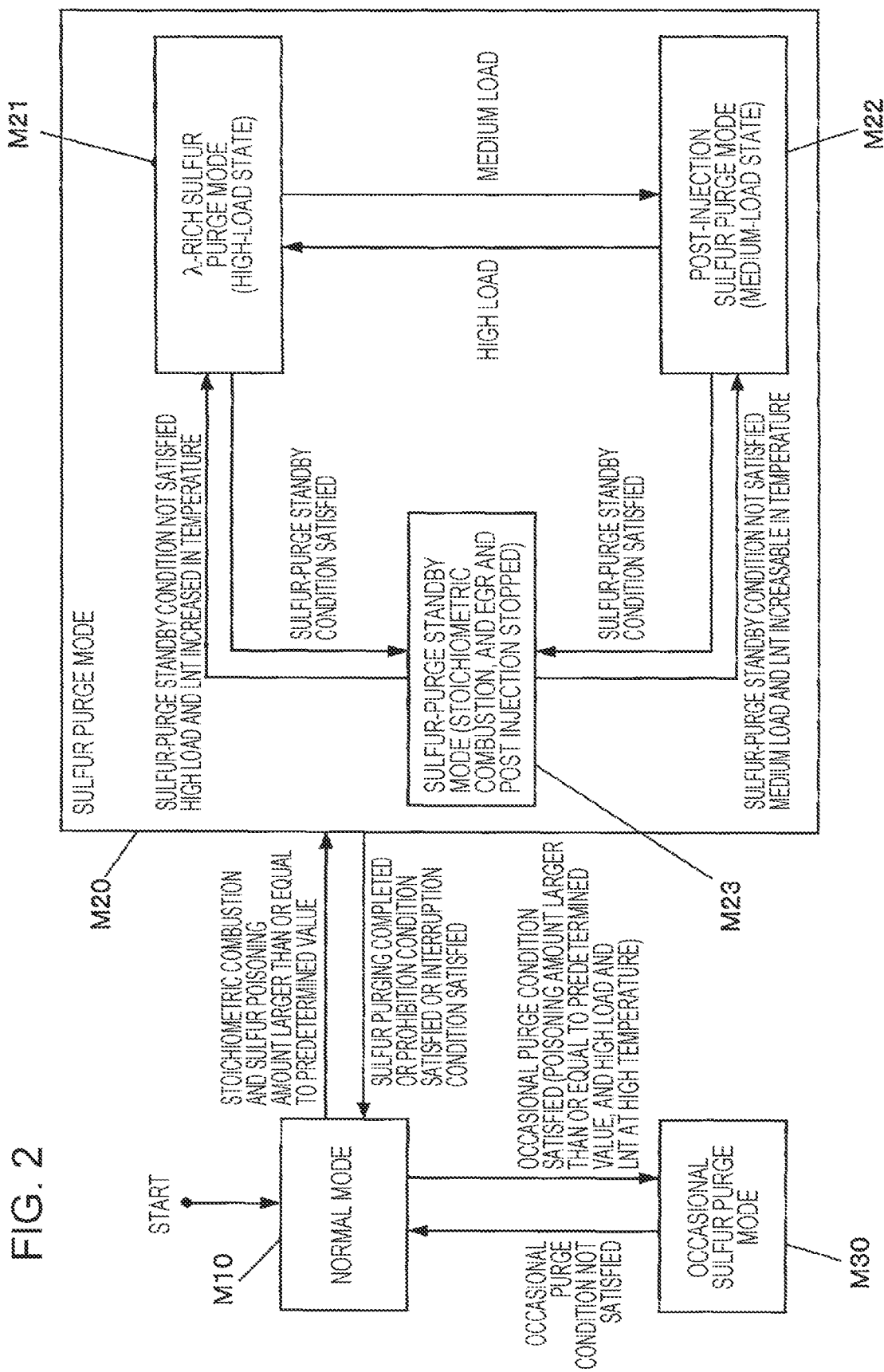
FIG. 2 illustrates state transitions in sulfur purge control of an occlusion reduction catalyst in the engine controller according to the embodiment.

FIG. 2 illustrates state transitions in the sulfur purge control of the occlusion reduction catalyst 64 in the engine controller according to this embodiment.

As illustrated in FIG. 2, the engine 1 has control modes, namely, a normal mode M10, a sulfur purge mode M20, and an occasional sulfur purge mode M30.

The sulfur purge mode M20 includes a λ-rich sulfur purge mode M21, a post-injection sulfur purge mode M22, and a sulfur-purge standby mode M23.

When the vehicle starts traveling, the normal mode M10 is selected.

In the normal mode M10, sulfur purging of the occlusion reduction catalyst 64 is not to be performed.

The normal mode M10 involves appropriately switching between stoichiometric combustion and lean combustion in accordance with the operating conditions (e.g., requested torque, rotation speed, and so on). In stoichiometric combustion, the average air-fuel ratio in the combustion chamber 31 becomes close to the theoretical air-fuel ratio. In lean combustion, the average air-fuel ratio in the combustion chamber 31 is in a lean fuel state relative to the theoretical air-fuel ratio.

The ECU 100 estimates a sulfur poisoning amount (i.e., $SO_X$ adsorption amount) with respect to the occlusion reduction catalyst 64 based on, for example, the past operational history of the engine 1.

In a case where the engine 1 is in a stoichiometric combustion state during the normal mode M10, if the estimated sulfur poisoning amount (i.e., temporary poisoning amount) is larger than or equal to a predetermined threshold value and a transition prohibition condition that prohibits a transition to the sulfur purge mode M20 is not satisfied, a transition is made to the sulfur purge mode M20.

The transition prohibition condition that prohibits a transition to the sulfur purge mode M20 is satisfied when, for example, at least one of the following conditions is satisfied:

a. the vehicle speed is in a predetermined high-speed state;

b. the fuel level of the vehicle is lower than or equal to a predetermined value;

c. a non-purgeable permanent poisoning amount is larger than or equal to a predetermined value (i.e., a state where a desired purging rate is not obtainable even by sulfur purging);

d. the coolant temperature in the engine 1 is below a predetermined value;

e. the valve-timing adjusting mechanism is in a non-operating state;

f. first learning of the intake pressure sensor 58 is incomplete;

g. air-fuel ratio learning is incomplete;

h. the air-fuel ratio sensors 66 and 67 and the $NO_X$ sensors are in an inactive state;

i. either of catalyst warm-up and heating request is more than or equal to a predetermined value;

j. the intake temperature is above an upper limit value (i.e., high intake temperature) or below a lower limit value (i.e., low intake temperature) of a predetermined temperature range;

k. the atmospheric pressure is below a predetermined lower limit value; and l. post-injection-amount characteristic learning ($Q_{min}$ learning) of the injector 59 is incomplete.

On the other hand, when the sulfur purge mode M20 is selected, if sulfur purging is completed (i.e., if the sulfur poisoning amount is smaller than or equal to a predetermined threshold value for purge completion) or if a predetermined sulfur-purge prohibition condition is satisfied, the mode is transitioned back to the normal mode M10.

Examples of the sulfur-purge prohibition condition include a case where misfire is detected and a case where a malfunction safety flag indicating that a malfunction has occurred in any kind of hardware, such as a sensor, or software is set.

The λ-rich sulfur purge mode M21 is a control mode in which sulfur purging is executed when, for example, the engine 1 is in a predetermined high-load operating state (e.g., the output torque and the rotation speed are both higher than or equal to a predetermined value) and the temperature of the occlusion reduction catalyst 64 has increased to a sulfur-purgeable temperature range.

In the λ-rich sulfur purge mode M21, the air-fuel ratio A/F (which can be expressed by an excess air ratio λ) of the engine 1 is rich, the occlusion reduction catalyst 64 at high temperature is supplied with fuel as a reducing agent, and $SO_X$ occluded in the occlusion reduction catalyst 64 is purged.

In this case, the EGR valve 82 is fixedly set to the closed state for suppressing a decrease in exhaust-gas temperature, so that EGR is prohibited.

The post-injection sulfur purge mode M22 is a control mode in which sulfur purging is executed when, for example, the engine 1 is in a predetermined medium-load operating state (e.g., the output torque and the rotation speed are both within a predetermined range lower than that in the high-load state) and the temperature of the occlusion reduction catalyst 64 has increased to the sulfur-purgeable temperature range as a result of performing a post injection.

In the post-injection sulfur purge mode M22, the air-fuel ratio in the combustion chamber 31 at the time of ignition of the engine 1 is set to a lean fuel state, and the exhaust device 60 is supplied with unburnt fuel by performing a post injection in the exhaust stroke.

A portion of the unburnt fuel supplied to the exhaust device 60 is combusted in the three-way catalyst 63 to increase the temperature of the exhaust gas, and is used for heating the occlusion reduction catalyst 64. The remaining portion of the unburnt fuel is supplied as a reducing agent to the occlusion reduction catalyst 64.

In this case, the EGR valve 82 is fixedly set to the closed state, so that EGR is prohibited.

In a state where the λ-rich sulfur purge mode M21 is selected, if the engine 1 changes from a high-load state to a medium-load state, a transition is made to the post-injection sulfur purge mode M22.

In a state where the post-injection sulfur purge mode M22 is selected, if the engine 1 changes from a medium-load state to a high-load state, a transition is made to the λ-rich sulfur purge mode M21.

When either of the λ-rich sulfur purge mode M21 and the post-injection sulfur purge mode M22 is selected, if a predetermined sulfur-purge standby condition is satisfied, the sulfur-purge standby mode M23 is selected.

The sulfur-purge standby mode M23 is a control mode to be executed when sulfur purging is interrupted due to a temporary phenomenon. This control mode is for maintaining the internal layer temperature of the occlusion reduction catalyst 64 so that the sulfur purging can be resumed immediately after the phenomenon is resolved.

In the sulfur-purge standby mode M23, the engine 1 operates in a stoichiometric combustion state, and the EGR valve 82 is set to the closed state.

The sulfur-purge standby condition based on which a transition is made to the sulfur-purge standby mode M23 involves, for example, satisfying at least one of the following conditions:

a. a requested torque based on, for example, an operation performed on the accelerator pedal by the driver is larger than or equal to a predetermined value;

b. the vehicle speed is higher than or equal to a predetermined value;

c. the transmission is in a non-traveling range (e.g., either one of the parking (P) range and the neutral (N) range);

d. evaporation gas that exceeds the capacity of the canister 70 has occurred and may possibly flow out into the atmosphere;

e. an estimated internal layer temperature of the three-way catalyst 63 has exceeded a predetermined upper limit value;

f. an estimated internal layer temperature of the occlusion reduction catalyst 64 has exceeded a predetermined upper limit value;

g. the estimated internal layer temperature of the three-way catalyst 63 is below a predetermined lower limit value;

h. there is a request for retarding the ignition timing; and i. there is a request for a rich air-fuel ratio for avoiding pre-ignition.

For example, if there is a predetermined operation input for the purpose of inspection at a maintenance site, the sulfur-purge standby condition may partially be alleviated.

For example, even when the vehicle speed is lower than or equal to the predetermined value or a non-traveling range is selected, a transition is not to be made to the sulfur-purge standby mode M23.

Furthermore, for preventing hunting, the aforementioned values, such as the predetermined values, the upper limit values, and the lower limit values, may each be provided with hysteresis in the case where the transition is to be made to the sulfur-purge standby mode M23 and the case where the transition is to be made back to the original mode from the sulfur-purge standby mode M23.

When the sulfur-purge standby mode M23 is selected, if the sulfur-purge standby condition becomes non-satisfied, the engine 1 is in a high-load state, and the temperature of the occlusion reduction catalyst 64 has already increased to a sulfur-purgeable state, a transition is made to the λ-rich sulfur purge mode M21.

Furthermore, when the sulfur-purge standby mode M23 is selected, if the sulfur-purge standby condition becomes non-satisfied, the engine 1 is in a medium-load state, and the temperature of the occlusion reduction catalyst 64 is increasable to a sulfur-purgeable state by performing a post injection, a transition is made to the post-injection sulfur purge mode M22.

In the sulfur purge mode M20 including the λ-rich sulfur purge mode M21, the post-injection sulfur purge mode M22, and the sulfur-purge standby mode M23, for example, if the sulfur purging is not completed over a predetermined upper-limit time period or longer due to the travel pattern of the vehicle, the driving pattern of the driver, and so on, interruption determination is satisfied for reducing fuel consumption. The interruption determination involves interrupting the sulfur purging in the driving cycle.

In the state where the sulfur purge mode M20 is selected, if the sulfur purging is completed or if either of the aforementioned prohibition condition and the interruption determination is satisfied, a transition is made to the normal mode M10.

Even in a case where the sulfur poisoning amount of the occlusion reduction catalyst 64 is smaller than the aforementioned threshold value, if the temperature of the occlusion reduction catalyst 64 has increased to a sulfur-purgeable state and the engine 1 is in a high-load state, the ECU 100 executes the occasional sulfur purge mode M30 by performing control similarly to that in the λ-rich sulfur purge mode M21. The occasional sulfur purge mode M30 involves performing sulfur purging occasionally.

According to this embodiment described above, the following effects can be achieved.

1. While either of the λ-rich sulfur purge mode M21 and the post-injection sulfur purge mode M22 is being executed, if it becomes difficult to continue with the sulfur purge control due to a temporary phenomenon, the sulfur-purge standby mode M23 involving performing a fuel injection to set the air-fuel ratio close to the stoichiometric air-fuel ratio and prohibiting EGR is executed, so that a decrease in the internal layer temperature of the occlusion reduction catalyst 64 is prevented. Thus, when the sulfur purge control can be resumed, the mode is transitioned back to either of the λ-rich sulfur purge mode M21 and the post-injection sulfur purge mode M22, so that a state where sulfur purging can be performed can be quickly recovered.

Accordingly, this enables an early recovery from sulfur poisoning of the occlusion reduction catalyst 64.

Furthermore, since sulfur purge control involves poor fuel efficiency, the fuel efficiency of the vehicle can be improved as a result of ending the sulfur purge control early.

Moreover, frequent switching of EGR between on and off modes is prevented, so that an occurrence of a torque shock can be prevented.

2. When a transition is made from the post-injection sulfur purge mode M22 to the sulfur-purge standby mode M23, a post injection is stopped, so that deterioration in fuel efficiency caused by performing a post injection regardless of the fact that sulfur purging is not performed can be prevented. In addition, an excessive temperature increase in the occlusion reduction catalyst 64 can also be prevented.

3. A transition is made to the sulfur-purge standby mode M23 when the requested torque of the engine 1 is larger than or equal to a predetermined value, so that the travel performance and the drivability of the vehicle can be enhanced without interfering with fuel injection control corresponding to a high output request in accordance with the execution of either of the λ-rich sulfur purge mode M21 and the post-injection sulfur purge mode M22.

4. In a case where at least one of the intake state of the engine 1, the combustion state of the engine 1, the temperature state of the engine 1, the temperature state of the three-way catalyst 63, the temperature state of the occlusion reduction catalyst 64, the adsorption state of the canister 70, or the detection state of each sensor temporarily deviates from a predetermined normal state, a transition is made to the sulfur-purge standby mode M23. Thus, if sulfur purging is interrupted due to a temporary phenomenon that is recoverable early with a high possibility, the sulfur purging can be resumed immediately after the phenomenon is resolved, thereby appropriately enabling an early recovery from sulfur poisoning of the occlusion reduction catalyst 64.

Modifications

The embodiment of the disclosure is not limited to that described above and permits various modifications and alterations. Such modifications and alterations are within the technical scope of the embodiment of the disclosure.

1. The configuration of the engine controller and the configuration of the engine are not limited to those in the above embodiment and are modifiable, where appropriate.

For example, the cylinder layout of the engine, the number of cylinders, the presence and absence of the turbocharger 40, and the disposition of each catalyst and sensor are changeable, where appropriate.

2. The condition for transitioning each control mode to another control mode in the embodiment is an example. The condition may be changed, another condition may be added, or the condition may be omitted, where appropriate. In addition, the details of control in each control mode are not particularly limited.

As described above, the embodiment of the disclosure can provide an engine controller that enables an early recovery from sulfur poisoning of a reduction catalyst.

The engine controller illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the engine controller. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. An engine controller configured to control an engine including an occlusion reduction catalyst in an exhaust device, the engine controller comprising:
 a fuel injection controller configured to control a fuel injection amount of an injector configured to inject fuel into a combustion chamber of the engine;
 an exhaust-gas-recirculation controller configured to control an exhaust-gas-recirculation device configured to introduce exhaust gas from the exhaust device of the engine to an intake device;
 a sulfur purge determiner configured to determine whether sulfur purging of the occlusion reduction catalyst is to be performed; and
 a sulfur purge controller configured to execute sulfur purge control in a case where the sulfur purge determiner determines that the sulfur purging is to be performed, the sulfur purge control comprising causing the fuel injection controller to perform a fuel injection such that an air-fuel ratio at an inlet of the occlusion reduction catalyst becomes rich and causing the exhaust-gas-recirculation controller to prohibit the introduction of the exhaust gas,
 wherein the sulfur purge controller is configured to execute sulfur-purge standby control in a case where a predetermined sulfur-purge standby condition is satisfied, and resume the sulfur purge control in a case where the sulfur-purge standby condition becomes non-satisfied after starting the sulfur-purge standby control, the sulfur-purge standby control comprising causing the fuel injection controller to perform the fuel injection such that the air-fuel ratio becomes close to a stoichiometric air-fuel ratio and causing the exhaust-gas-recirculation controller to prohibit the introduction of the exhaust gas.

2. The engine controller according to claim 1, wherein the sulfur purge controller is configured to cause the fuel injection controller to perform an exhaust stroke injection in a case where the occlusion reduction catalyst has a temperature lower than or equal to a predetermined value when the sulfur purge controller executes the sulfur purge control, and cause the fuel injection controller to stop the exhaust stroke injection while the sulfur purge controller executes the sulfur-purge standby control.

3. The engine controller according to claim 1, wherein the sulfur purge controller is configured to determine that the sulfur-purge standby condition is satisfied in a case where an output request of the engine is more than or equal to a predetermined value.

4. The engine controller according to claim 2, wherein the sulfur purge controller is configured to determine that the sulfur-purge standby condition is satisfied in a case where an output request of the engine is more than or equal to a predetermined value.

5. The engine controller according to claim 1, wherein the sulfur purge controller is configured to determine that the sulfur-purge standby condition is satisfied in a case where at least one of an intake state of the engine, a combustion state of the engine, a temperature state of the engine, a temperature state of a three-way catalyst provided in the exhaust device, a temperature state of the occlusion reduction catalyst, an adsorption state of a canister of a fuel evaporation gas processor, or a detection state of a sensor provided in the engine temporarily deviates from a predetermined normal state.

6. The engine controller according to claim 2, wherein the sulfur purge controller is configured to determine that the sulfur-purge standby condition is satisfied in a case where at least one of an intake state of the engine, a combustion state of the engine, a temperature state of the engine, a temperature state of a three-way catalyst provided in the exhaust device, a temperature state of the occlusion reduction catalyst, an adsorption state of a canister of a fuel evaporation gas processor, or a detection state of a sensor provided in the engine temporarily deviates from a predetermined normal state.

7. The engine controller according to claim 3, wherein the sulfur purge controller is configured to determine that the sulfur-purge standby condition is satisfied in a case where at least one of an intake state of the engine, a combustion state of the engine, a temperature state of the engine, a temperature state of a three-way catalyst provided in the exhaust device, a temperature state of the occlusion reduction catalyst, an adsorption state of a canister of a fuel evaporation gas processor, or a detection state of a sensor provided in the engine temporarily deviates from a predetermined normal state.

8. The engine controller according to claim 4, wherein the sulfur purge controller is configured to determine that the sulfur-purge standby condition is satisfied in a case where at least one of an intake state of the engine, a combustion state of the engine, a temperature state of the engine, a temperature state of a three-way catalyst provided in the exhaust device, a temperature state of the occlusion reduction catalyst, an adsorption state of a canister of a fuel evaporation gas processor, or a detection state of a sensor provided in the engine temporarily deviates from a predetermined normal state.

9. An engine controller configured to control an engine including an occlusion reduction catalyst in an exhaust device, the engine controller comprising:
 circuitry configured to
  control a fuel injection amount of an injector configured to inject fuel into a combustion chamber of the engine,
  control an exhaust-gas-recirculation device configured to introduce exhaust gas from the exhaust device of the engine to an intake device,
  determine whether sulfur purging of the occlusion reduction catalyst is to be performed,
  execute sulfur purge control upon determining that the sulfur purging is to be performed, the sulfur purge control comprising performing a fuel injection such that an air-fuel ratio at an inlet of the occlusion reduction catalyst becomes rich and prohibiting the introduction of the exhaust gas, and execute sulfur-purge standby control in a case where a predetermined sulfur-purge standby condition is satisfied, and resume the sulfur purge control in a case where the sulfur-purge standby condition becomes non-satisfied after starting the sulfur-purge standby control, the sulfur-purge standby control comprising performing the fuel injection such that the air-fuel ratio becomes close to a stoichiometric air-fuel ratio and prohibiting the introduction of the exhaust gas.

* * * * *